United States Patent [19]
Hughes

[11] Patent Number: 5,183,446
[45] Date of Patent: Feb. 2, 1993

[54] DIFFERENTIAL MECHANISM

[76] Inventor: Richard E. Hughes, 49 Burstow Rd., Wimbledon, London SW20 8ST, England

[21] Appl. No.: 841,826

[22] Filed: Feb. 26, 1992

[30] Foreign Application Priority Data

Mar. 6, 1991 [GB] United Kingdom ............... 9104816

[51] Int. Cl.⁵ .................................... F16H 1/45
[52] U.S. Cl. .............................. 475/236; 475/231
[58] Field of Search .......................... 475/231, 236

[56] References Cited

U.S. PATENT DOCUMENTS

| | | | |
|---|---|---|---|
| 2,392,441 | 1/1946 | Wildhaber | 475/231 X |
| 2,490,146 | 12/1949 | Miller, Jr. | 475/231 X |
| 2,569,015 | 9/1951 | Miller, Jr. | 475/231 X |
| 3,027,781 | 4/1962 | O'Brien | 475/231 |
| 3,053,114 | 9/1962 | Singer | 475/231 X |

FOREIGN PATENT DOCUMENTS

| | | | |
|---|---|---|---|
| 1581611 | 7/1990 | U.S.S.R. | 475/236 |
| 0445314 | 4/1936 | United Kingdom . | |

*Primary Examiner*—Dirk Wright
*Attorney, Agent, or Firm*—Pandiscio & Pandiscio

[57] ABSTRACT

Figure 1:
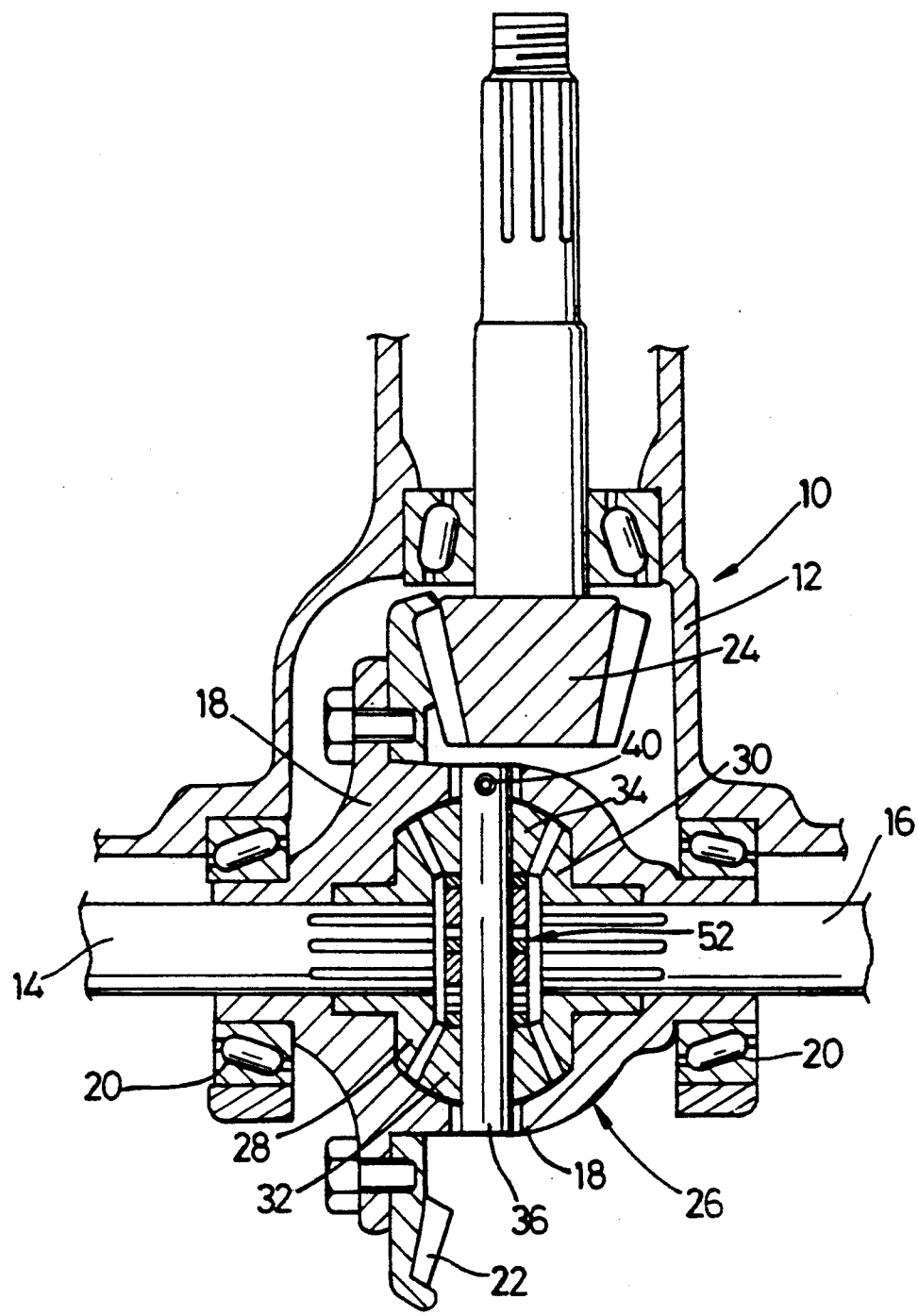

Limited slip differential, e.g. for vehicle transmissions, seen in FIG. 1, has a carrier (18) rotating about a first axis in a support casing (12) typically driven by a crown wheel (22) and main drive pinion (24). A pair of output half shafts (14, 16) on said axis have output pinions (28, 30) within the carrier meshing with at least one, and preferably a pair, of planet pinions (32, 34) journalled in the carrier on a second axis normal to first axis to allow differential motion of the output shafts while transmitting drive to both from the rotating carrier in known manner.

Controlled shifting of the planet gear(s) relative to the carrier by angular displacement of the second axis in a diametral plane of the first axis from a neutral position to an inhibiting position, e.g. by displacement of a planet gear shaft (36) in slots (38) of the carrier, when the carrier is subjected to drive torque brings formations, e.g. end faces (42, 44) of the planet gears, into braking engagement with formations (46, 48) of the carrier so as to inhibit the differential action.

15 Claims, 3 Drawing Sheets

DIFFERENTIAL MECHANISM

This invention relates to differential mechanisms as used in the drive transmissions of land vehicles and is more specifically concerned with limited slip differential mechanisms incorporating provision for automatically inhibiting the differential action if conditions arise in which there is substantial inequality of effective driving torque at the two driven output shafts or other driven outputs of the mechanism e.g. when wheel spin would otherwise tend to occur.

Numerous proposals have been put forward for meeting this requirement ranging from basic operator-controlled devices for selectively locking the differential or braking rotation of the slipping wheel independently of the other wheels, to more complex devices intended to operate automatically. Some examples of the latter forms of device are described in GB 878077, GB 924805, GB 924883, GB 925176, and EP 0016641 but these have not always proved successful and acceptable in practice and some of them are complex and costly to manufacture and maintain.

The object of the invention is to provide a differential mechanism having automatic limited slip operation which is simple in construction, durable and reliable in use, and effective in providing the desired results.

According to the invention there is provided a limited slip differential mechanism including a casing or other supporting formation, a carrier journalled on or in said formation for operatively driven rotation about a first axis, a pair of driven output elements each journalled for independent rotation about said first axis, and at least one planet gear journalled in the carrier for rotation therewith and itself rotatable about a second axis normal to the first axis, said planet gear being meshed with both output elements to transmit drive thereto in common from the carrier while permitting differential motion of the output elements relative to each other characterised in that said planet gear can shift relative to the carrier by angular displacement of the second axis relative to the carrier in a diametral plane of the first axis between a neutral position at which the planet gear can rotate freely in providing said differential motion and an inhibiting position at which rotation of said gear is resisted or prevented by direct or indirect coaction between the planet gear and a braking or stop formation of or on the carrier whereby the differential motion is inhibited automatically as a function of the transmitted driving force transmitted through the carrier.

Preferably there will be a pair of said planet gears disposed to mesh with diametrally opposite sides of both output elements so that they rotate in opposite directions under the differential motion and conveniently, but not essentially, both planet gears will be displaceable as referred to above between neutral and inhibiting positions. Conveniently they will both be carried on a common planet gear shaft located in the carrier, the shaft itself together with the planet gears being angularly displaceable as aforesaid.

Preferably the assembly will include provision for adjustable preloading of the planet gear or gears to provide predetermined resistance to its or their rotation about the second axis at the inhibiting position.

Preferably the inhibition of differential action is by a progressive braking effect through frictional engagement with said coacting formation without locking the planet gear(s) solid which could cause excessive stressing and consequent damage to components of the mechanism. It is desirable that the gear or gears are resiliently preloaded as aforesaid.

Figure 2:
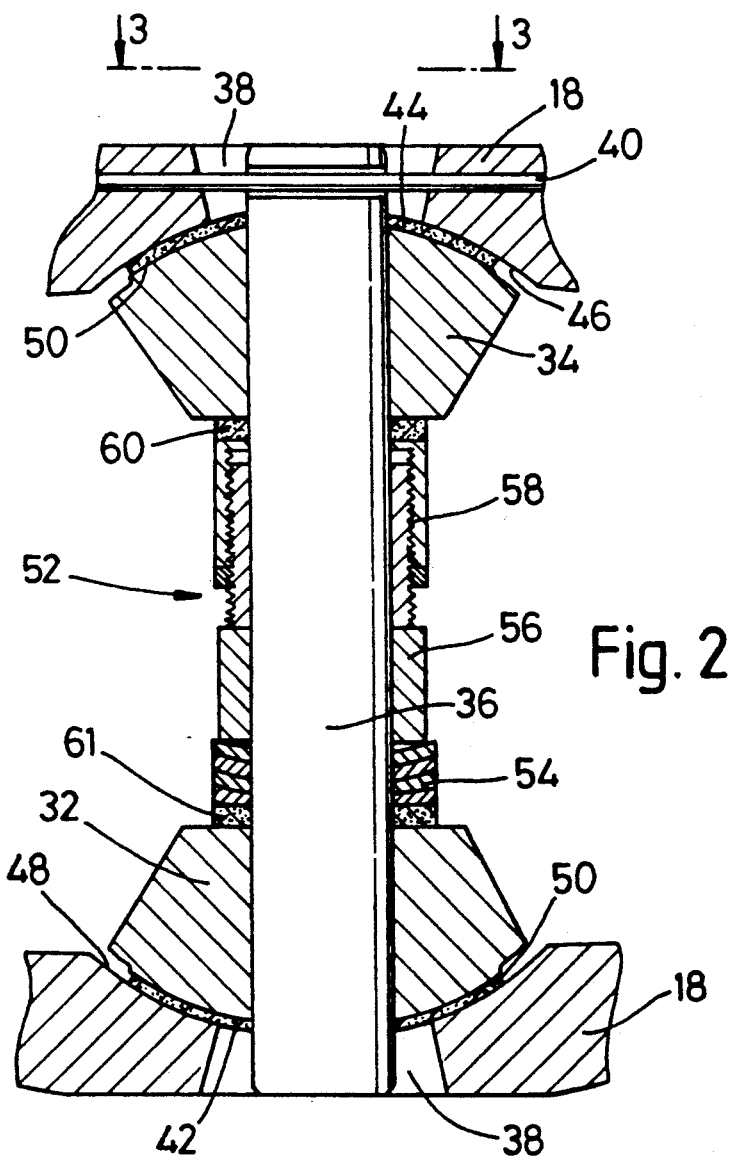
Figure 3A:
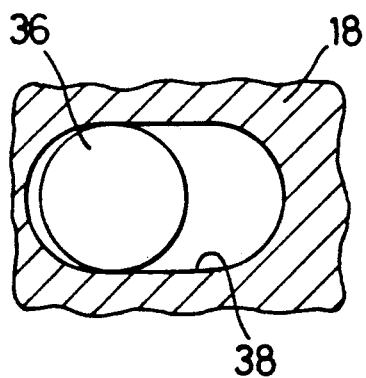
Figure 3B:
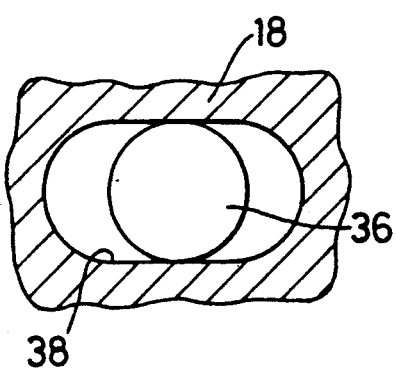
Figure 4:
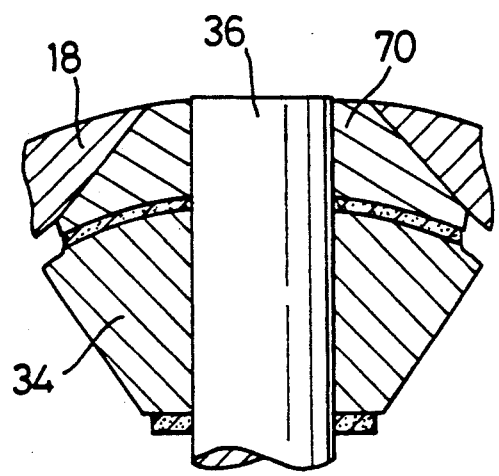
Figure 5:
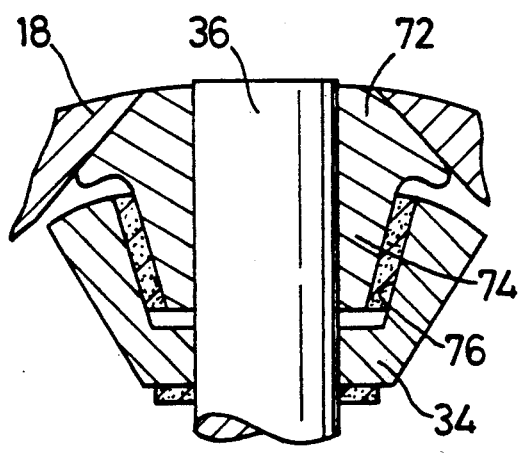

Examples of the invention are now more particularly described with reference to the accompanying drawings, wherein:

FIG. 1 is a cross section of a vehicle final drive unit incorporating differential mechanism of the invention, FIG. 2 is a detail on an enlarged scale showing the location of planet gears of the mechanism, FIGS. 3a and 3b are end views in the direction of arrows 3—3 on FIG. 2, and FIGS. 4 and 5 are sectional details of modified planet gear arrangements.

Referring firstly to FIG. 1 the final drive unit 10 shown by way of example is a land vehicle axle unit of generally conventional layout having an axle casing 12 (part only shown) locating a pair of half shafts 14, 16 on a common first axis which will drive near and offside road wheels (not shown) in the usual way.

The inner ends of shafts 14, 16 are received in a coaxially rotating carrier 18 journalled on bearings 20 in casing 12. The carrier mounts a crown wheel 22 meshing with a main drive input pinion 24 also journalled in casing 12 so that the carrier is operatively rotatably driven about the first axis.

Differential mechanism indicated generally as 26 acts between half shafts 14, 16 within and carried by the carrier 18. The inner end of each said shaft mounts a respective drive output element in the form of an output pinion 28, 30. These pinions are spaced axially apart in facing relationship and are located against axial outward thrust by bearing surfaces of carrier 18, the shafts 14, 16 having splined engagement with them.

Meshing with both pinions 28, 30 at diametrally opposite positions are a pair of planet pinions 32, 34 located on a common second axis normal to the first axis of rotation of shafts 14, 16 and carrier 18. Pinions 32, 34 are located by and are rotatable on a common planet gear shaft 36 which is in turn located in carrier 18 in the manner described in greater detail below.

As thus far described planet pinions 32, 34 act in conventional manner to permit differential relative motion of the two output pinions 28, 30 and their associated road wheels as when the vehicle is cornering, while transmitting drive from the rotatably driven carrier 18 to both output pinions 28, 30 in common.

The construction and mounting of the planet pinions and related components of the mechanism 26 is shown in FIGS. 2 and 3. The outer ends of the gear shaft 36 locate in slots 38 defined by the carrier 18. The slots are elongated in the direction of rotation of the carrier so that said shaft and the two planet pinions can shift angularly in a plane of the second axis normal to the first axis from a neutral position shown in FIGS. 2 and 3b where the shaft is centered in the slots 38 to an inhibiting position shown in FIG. 3a in which the ends of the shaft are displaced towards the ends of the slots. Shaft 36 is located against axial displacement from the carrier 18 by a cross pin 40 engaging a through bore near one end of the shaft, said pin running longitudinally of the related slot 38 so that it does not prevent said angular displacement.

The axially outer faces 42, 44 of pinions 32, 34 have an outwardly convex part-spherical form and the adjacent inner faces of the portions of the carrier 18 around the slots 38 have a generally complementary shape formed as concave part-spherical surfaces 46, 48. The latter surfaces constitute coacting formations of the carrier providing the inhibition of differential action referred to below.

The end faces 42, 44 are preferably provided with domed braking pads 50 of high friction material.

Pinions 32, 34 can shift axially on shaft 36 and they are pre-loaded axially outwardly of each other by an adjustable resilient sleeve assembly 52 best seen in detail in FIG. 2.

Said assembly is located on shaft 36 between the axially inner end faces of pinions 32, 34 and comprises a stack of dished resilient spring or Belville washers 54, a spacer sleeve 56, an adjustable compression sleeve 58 having inner and outer parts in screw threaded engagement for selective adjustment of its effective axial length, secured by a lock nut against displacement once adjusted, and annular inner brake pads 60, 61 of high friction material which bear respectively against the inner end faces of pinions 34 and 32 in opposite directions.

On assembly the sleeve assembly 52 is adjusted to provide predetermined resilient pre-loading of the pair of pinions 32, 34 axially outwardly of each other.

Any axial adjustment of the output pinions 28, 30 needed to ensure correct meshing with planet pinions 32, 34 will be achieved on assembly by inserting spacer shims between the axially outer faces of pinions 28, 30 and the carrier 18.

The radii on which the part-spherical surfaces respective to the pinions 32, 34 and the carrier formations 46, 48 are struck are slightly different so that, when shaft 36 is angularly displaced towards the inhibiting position indicated in FIG. 3a (or displaced in the opposite direction from the neutral position i.e. to the right rather than the left as viewed in FIG. 3 which also constitutes an inhibiting condition) the two pinions 32, 34 will be axially compressed on shaft 36 providing a braking force to substantially inhibit planet pinion rotation and thus inhibit differential motion between the output pinions 28, 30. The greater the angular displacement of shaft 36 the greater the inhibiting force though as said force is applied resiliently through the medium of the spring washers 54, and as the angular displacement of shaft 36 is limited by the length of slots 38, the arrangement is such that progressive force is never sufficient to completely lock the differential mechanism.

The drive torque applied through carrier 18 as it rotates in the direction of arrow 63 (FIG. 3a) causes the outer ends of shaft 36 and hence pinions 32, 34 to lag relative to said direction of rotation so providing said inhibiting action. If the vehicle corners, the faster rotation of the road wheel which is outermost on the corner will urge the shaft 36 back towards the neutral position as the output pinion associated with said road wheel tends to overtake the rotational speed of carrier 18 so that the differential motion necessary for free turning (which is, in any case, usually needed under conditions of low driving torque) is maintained. The greater the applied drive torque the greater the inhibiting effect so resisting or substantially preventing wheel spin.

It will be noted that the braking effect acting on pinions 32, 34 is applied to them in an axial inward direction by, in effect, squeezing them together in coaction with the opposing carrier surfaces 46, 48. Also axial translation of said pinions relative to the carrier and the output pinions 28, 30 is very small. This is in contrast to some proposed limited-slip differential mechanisms in which axial braking or shifting forces are applied to pinions of the assembly in directions or to an extent which can cause undesirable gear meshing stresses and consequent wear and risk of failure. Such arrangements may also necessitate substantial reinforcement of the carrier and/or axle casing to withstand the braking forces involved and/or specially shaped casings and components to accommodate the additional mechanism.

It will be appreciated that various arrangements of interacting faces or other formations of or associated with the planet pinions and the carrier could be provided for inhibiting the differential motion on the angular displacement of the planet pinion axis relative to the carrier. Two possible alternative arrangements are illustrated diagrammatically in FIGS. 4 and 5.

In FIG. 4 the outer end of the planet gear shaft 36 is located in a wedge-shaped insert 70 receive movably within a complementary taper-faced seating of the carrier 18. An axially inner face of insert 70 coacts with the axially outer face of the related planet pinion 34. As shaft 36 is displaced angularly along the direction of carrier rotation insert 70 will be cammed inwardly to provide an axial braking force on the planet pinions.

FIG. 5 shows a similar arrangement except that an insert 72 in which the end of shaft 36 locates as before coacts with the main part of carrier 18 to urge a male coned braking formation 74 axially into braking engagement with a complementary female coned braking face 76 in the outer end of associated pinion 34.

The invention can be applied to standard sizes and patterns of differential axle or transmission units with little modification of the size and shape of their main components so presenting ease of interchangeability and economy of manufacture and fitting.

I claim:

1. A limited slip differential mechanism including a supporting formation, a carrier journalled on or in said formation for operatively driven rotation about a first axis, a pair of driven output elements each journalled for independent rotation about said first axis, and at least one planet gear journalled in the carrier for rotation therewith and itself rotatable about a second axis normal to the first axis, said planet gear being meshed with both output elements to transmit drive thereto in common from the carrier while permitting differential motion of the output elements relative to each other; characterized in that said planet gear can shift relative to the carrier by angular displacement of the second axis relative to the carrier in a plane normal to the first axis between a neutral position at which the planet gear can rotate freely in providing said differential motion and an inhibiting position at which rotation of said gear is resisted or prevented by direct or indirect coaction between the planet gear and a braking or stop formation of or on the carrier whereby the differential motion is inhibited automatically as a function of the transmitted driving force transmitted through the carrier.

2. A mechanism as in claim 1 including a pair of said planet gears disposed to mesh with diametrally opposite sides of both output elements so that they rotate in opposite directions under the differential motion.

3. A mechanism as in claim 2 wherein each said planet gear is displaceable between neutral and inhibiting positions.

4. A mechanism as in claim 3 wherein the planet gears are both carried on a common planet gear shaft located in the carrier, the shaft itself together with the planet gears being angularly displaceable between neutral and inhibiting positions.

5. A mechanism as in claim 4 including provision for adjustable preloading of the planet gear or gears to provide predetermined resistance to its or their rotation about the second axis at the inhibiting position.

6. A mechanism as in claim 5 wherein said preloading is resilient.

7. A mechanism as in claim 5 wherein the planet gears are displaceable relative to each other along the second axis, said preloading being effected by a preloading assembly located on the planet gear shaft to urge said gears apart from each other.

8. A mechanism as in claim 7 wherein the preloading assembly includes spring means, a compression sleeve selectively adjustable in effective length, and brake pads of high friction material acting on the planet gears.

9. A mechanism as in claim 1 in which said inhibition of differential motion is progressively effected by frictional braking engagement with said formation of or on the carrier on displacement of the or each planet gear to the inhibiting position.

10. A mechanism as in claim 9 wherein the carrier has a braking formation for frictional engagement with a complementary surface of the or each planet gear at the inhibiting position.

11. A mechanism as in claim 10 wherein said formation or surface includes a facing of high friction braking material.

12. A mechanism as in claim 10 wherein the braking formation and complementary surface are part-spherical in shape and so radiussed that the angular displacement of the second axis causes said progressive inhibition.

13. A mechanism as in claim 10 wherein the braking formation of the carrier is a wedge shaped insert seated in a taper seating and having a face in coacting relationship to the complementary surface of the or each planet gear whereby displacement of the second axis to the inhibiting position cams said insert into progressive braking engagement with the respective planet gear.

14. A mechanism as in claim 9 wherein angular displacement of the second axis beyond a predetermined inhibiting position is positively prevented to limit the braking engagement so that the planet gear or gears are not completely locked.

15. A mechanism as in claim 1 wherein the second axis can be displaced in either direction in said diametral plane from a median neutral position so that said inhibition of differential motion will take place on drive of the carrier in either direction of rotation.

* * * * *